US012626586B1

(12) United States Patent
Duran

(10) Patent No.: US 12,626,586 B1
(45) Date of Patent: May 12, 2026

(54) IN-GROUND CROSSWALK CONTROL AND SIGNAL SYSTEM

(71) Applicant: Rosa Duran, San Pedro, CA (US)

(72) Inventor: Rosa Duran, San Pedro, CA (US)

( * ) Notice: Subject to any disclaimer, the term of this patent is extended or adjusted under 35 U.S.C. 154(b) by 0 days.

(21) Appl. No.: 18/075,167

(22) Filed: Dec. 5, 2022

Related U.S. Application Data

(60) Provisional application No. 63/285,771, filed on Dec. 3, 2021.

(51) Int. Cl.
*G08G 1/005* (2006.01)

(52) U.S. Cl.
CPC .................................... *G08G 1/005* (2013.01)

(58) Field of Classification Search
CPC ........ G08G 1/005; G08G 1/087; G08G 1/056; G08G 1/07; G08G 1/012; G08G 1/164; G08G 1/0116; G08G 1/015; G08G 1/04; G08G 1/042; G08G 1/09; G08G 1/00; G08G 3/00; G08G 5/00; G08G 7/00; G08G 9/00; G08G 99/00; B60Q 1/00; B60Q 3/00; B60Q 5/00; B60Q 7/00; B60Q 9/00; B60Q 11/00; B60Q 2200/00; B60Q 2300/00; B60Q 2400/00; B60Q 2500/00; B60Q 2800/00; B60Q 2900/00; G06V 10/751; G06V 20/52; G06V 2201/08; G06V 10/00; G06V 20/00; G06V 30/00; G06V 40/00; G06V 2201/00; G08B 21/02; G08B 7/06; G08B 1/00; G08B 3/00; G08B 5/00; G08B 6/00; G08B 7/00; G08B 9/00; G08B 13/00; G08B 15/00; G08B 17/00; G08B 19/00; G08B 21/00; G08B 23/00; G08B 25/00;

(Continued)

(56) References Cited

U.S. PATENT DOCUMENTS 7,588,726 B1 * 9/2009 Mouradian ........ G01N 33/0009 702/22
2009/0075040 A1 * 3/2009 Gorman .................. E01F 9/578 428/203

(Continued)

FOREIGN PATENT DOCUMENTS

CN 208235365 * 4/2018
KR 101099285 * 10/2009
KR 20180009016 * 7/2016 ............ G08G 1/005

*Primary Examiner* — Daniel Previl
(74) *Attorney, Agent, or Firm* — John Rizvi; John Rizvi, P.A.—The Patent Professor®

(57) ABSTRACT

A method and an apparatus provide an in-ground pedestrian crosswalk signaling actuator. An in-ground crosswalk control and signaling (ICCS) apparatus displays a crosswalk signal status and enables a pedestrian seeking to cross a street to depress the in-ground actuator button to change a signal status from a STOP signal to a GO signal. When a traffic signal controller of the ICCS apparatus detects a street-level button actuation, the controller initiates a status change countdown. In response to the countdown being completed, the controller changes the signal status to the GO signal. In addition, the controller triggers a display of a street-level signal indicating the current GO signal status. According to an aspect, the controller is electrically connected to a vehicular traffic light system, and a manual pedestrian crosswalk signal apparatus with which the ICCS apparatus remains synchronized.

20 Claims, 7 Drawing Sheets

(58) Field of Classification Search

CPC ........ G08B 26/00; G08B 27/00; G08B 29/00; G08B 31/00; H04W 4/027; H04W 4/00; H04W 8/00; H04W 12/00; H04W 16/00; H04W 24/00; H04W 28/00; H04W 36/00; H04W 40/00; H04W 48/00; H04W 52/00; H04W 56/00; H04W 60/00; H04W 64/00; H04W 68/00; H04W 72/00; H04W 74/00; H04W 76/00; H04W 80/00; H04W 84/00; H04W 88/00; H04W 92/00; H04W 99/00

USPC ............... 340/944, 935, 953, 973, 991, 994, 340/995.13, 995.17, 427–429, 426.23, 340/438

See application file for complete search history.

(56) References Cited

U.S. PATENT DOCUMENTS

2020/0074846 A1* 3/2020 York ...................... G08G 1/095
2021/0217304 A1* 7/2021 Shino ..................... G08G 1/123
2021/0295686 A1* 9/2021 Cross ..................... G08G 1/087

* cited by examiner

IN-GROUND CROSSWALK CONTROL AND SIGNAL SYSTEM

CROSS-REFERENCE TO RELATED APPLICATIONS

This application claims the benefit of U.S. Provisional Patent Application Ser. No. 63/285,771, filed on Dec. 3, 2021, which is incorporated herein in its entirety.

FIELD OF THE INVENTION

The present invention relates generally to traffic control systems, and more particularly, to pedestrian actuated traffic control systems.

BACKGROUND OF THE INVENTION

Pedestrian controlled crosswalk signaling systems enable a pedestrian intending to cross a street to manually depress a call button that ultimately provides the pedestrian with a walk signal while vehicular traffic stops or cedes a right-of-way to a pedestrian crossing the street. Crosswalk signaling systems often include pedestrian call buttons installed at traffic lights with a dedicated pedestrian signal, and these call buttons are used to bring up the pedestrian "walk" indication. In general, pedestrians will have to wait until a countdown is completed for the "walk" indication.

Individuals interact with pedestrian call buttons using their hands. However, in a world forever changed by the COVID-19 pandemic, manual interaction with a call button represents a potential safety hazard. Another problem with the traditional pedestrian call buttons is that they may not be convenient and/or accessible for individuals that are disabled or handicapped.

Ideally, it would be extremely useful to provide a pedestrian crosswalk signaling system that enables an individual to safely trigger a walk indication. In addition, the system should be usable and convenient for pedestrians and/or individuals with sidewalk friendly transportation, as well as disabled and/or handicapped individuals.

Accordingly, there is need for a safe pedestrian crosswalk signaling system that is accessible to the disabled and the handicapped, minimizes the spreading of germs, and yet remains compatible with the current crosswalk signaling system.

SUMMARY OF THE INVENTION

The present invention is directed to a method and an apparatus for providing an in-ground pedestrian crosswalk signaling actuator. An in-ground crosswalk control and signaling (ICCS) apparatus displays a crosswalk signal status and enables a pedestrian seeking to cross a street to depress the in-ground actuator button to change a signal status from a STOP signal to a GO signal. When a traffic signal control unit or controller of the ICCS apparatus detects a street-level button actuation, the controller initiates a signal status change countdown. In response to the countdown being completed, the controller changes the signal status to the GO signal. In addition, the controller triggers a display of a street-level signal indicating the current GO signal status. According to an aspect, the controller is electrically connected to a vehicular traffic light system/apparatus and a manual pedestrian crosswalk signal apparatus with which the ICCS apparatus remains synchronized.

According to an aspect, the street-level segment incorporates a pressure sensitive area that is used to control a street signal. The pressure sensitive area is designed to be actuated by foot action or pressure applied by a tire or wheel. According to one or more related aspects, the pressure sensitive area is a portion of a button/actuator which can be depressed by a pedestrian's foot, a scooter wheel, a bicycle type, a wheel of a wheelchair, etc., to initiate a countdown to a change of walk signal status. According to one or more related aspects, the street-level segment protrudes from the pavement/ground in which the street-level segment is embedded to enable the button/actuator to be accessible and to enable an individual to easily interact with and depress the button/actuator.

According to an aspect, in order to clearly indicate an active signal status, a street-level actuator and signal status interface includes a light system, which may include a number of light-emitting diodes (LEDs). Each status icon is associated with a particular subset of lights/LEDS. Thus, the in-ground crosswalk control and signaling (ICCS) apparatus indicates that an individual(s) may cross a street (e.g., via crosswalk) by activating a first set of lights/LEDS that are associated with the walking pedestrian icon. According to an implementation, the first set of lights/LEDS include green lights/LEDS, which intuitively indicate a GO status, conforming with universal traffic signaling color standards. On the other hand, red lights/LEDs within associated STOP indicator icons/symbols can be used to intuitively indicate a STOP status.

According to an aspect, by periodically activating a second set of lights/LEDS associated with the "STEP TO GO" command, the in-ground crosswalk control and signaling (ICCS) apparatus can remind an individual(s) that he may trigger a change in signal status from a STOP signal to a GO signal by depressing the button/actuator portion of the street-level actuator and signal status interface.

According to one or more aspects, the street-level actuator and signal status interface provides signals and buttons that may be configured to allow a pedestrian to actuate the buttons by foot while monitoring the signals with their head/eyes directed towards the ground at the exposed interface. The street-level actuator and signal status interface helps to prevent the spread of germs while providing a supplementary signaling means for those that choose to focus their attention at the street-level. For example, a person focused/fixated on the smart-phone screen can easily see or glance at the signaling status icons in a lower line of sight of the individual/pedestrian.

According to one or more aspects, the ICCS apparatus includes a street-level actuator and signal status interface to enable communication with a blind person and/or someone having one or more of a set of disabilities. Thus, for example, the street-level actuator and signal status interface can be actuated by the wheel of a wheel-chair. In addition, the street-level actuator and signal status interface provides audible signal status indications when an individual steps on the actuator/button or depresses the actuator/button with a walking stick or white cane.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Figure 2:
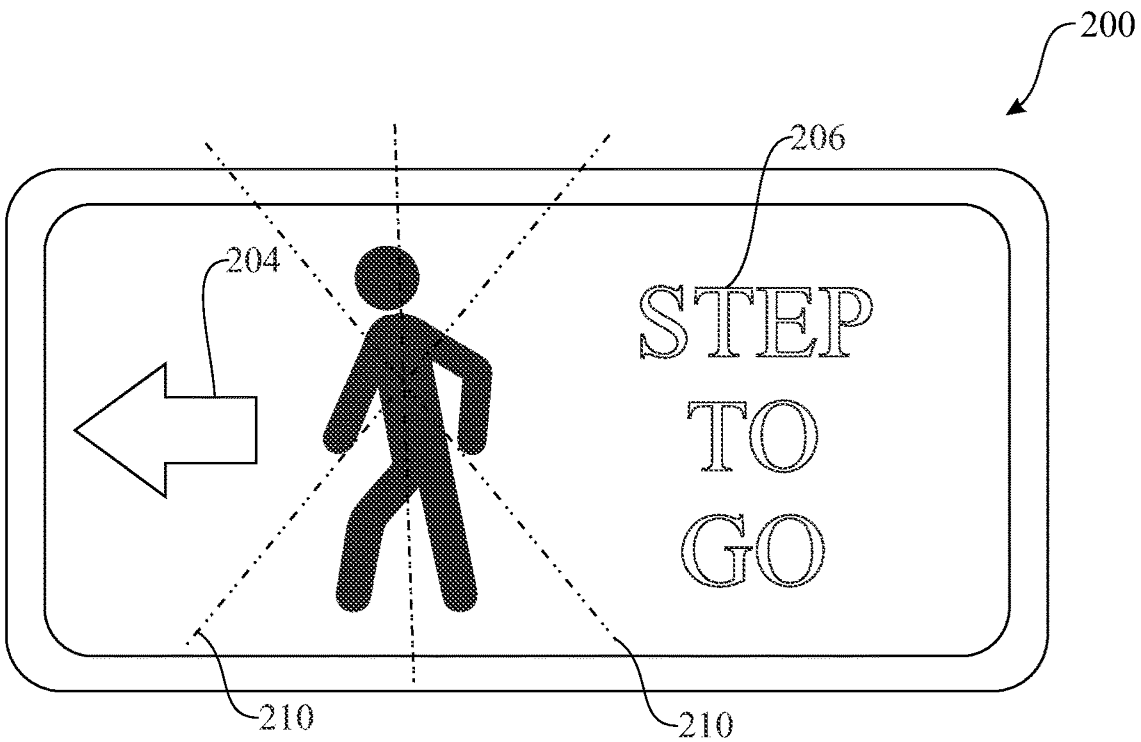
Figure 3:
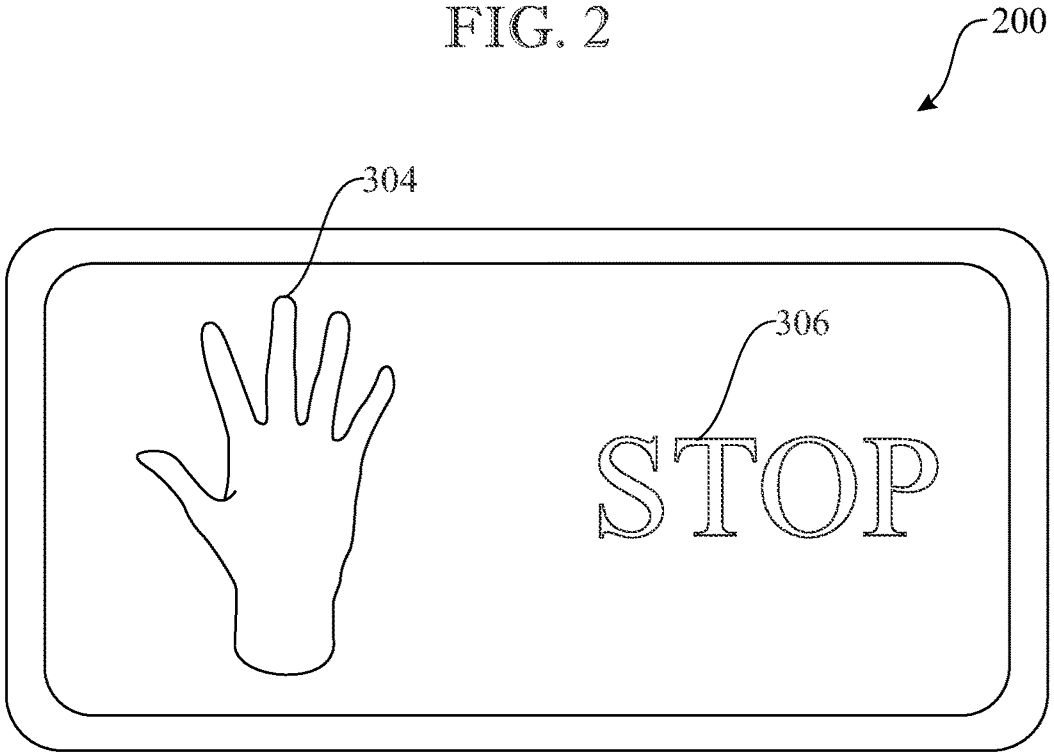
Figure 4:
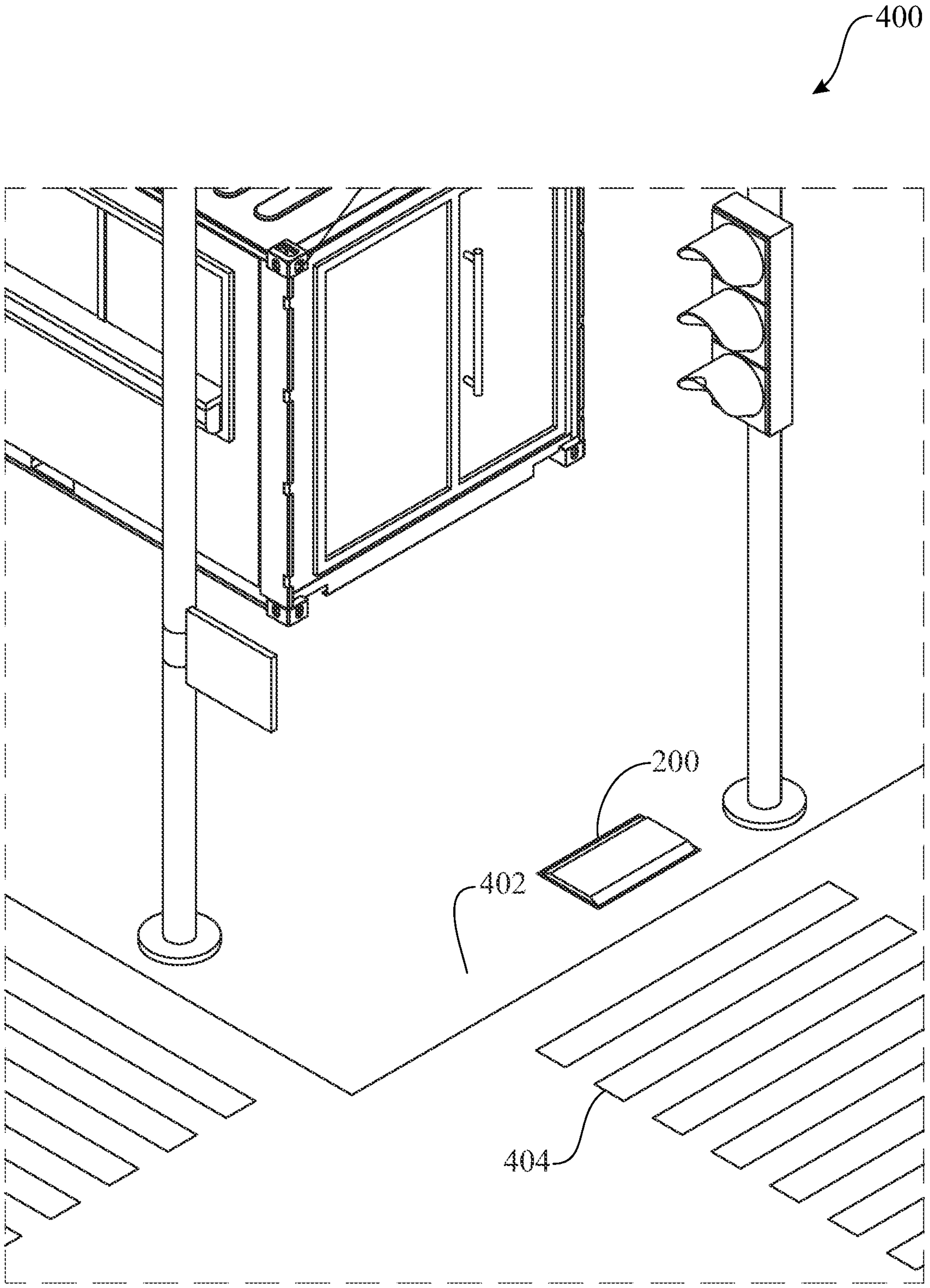
Figure 5:
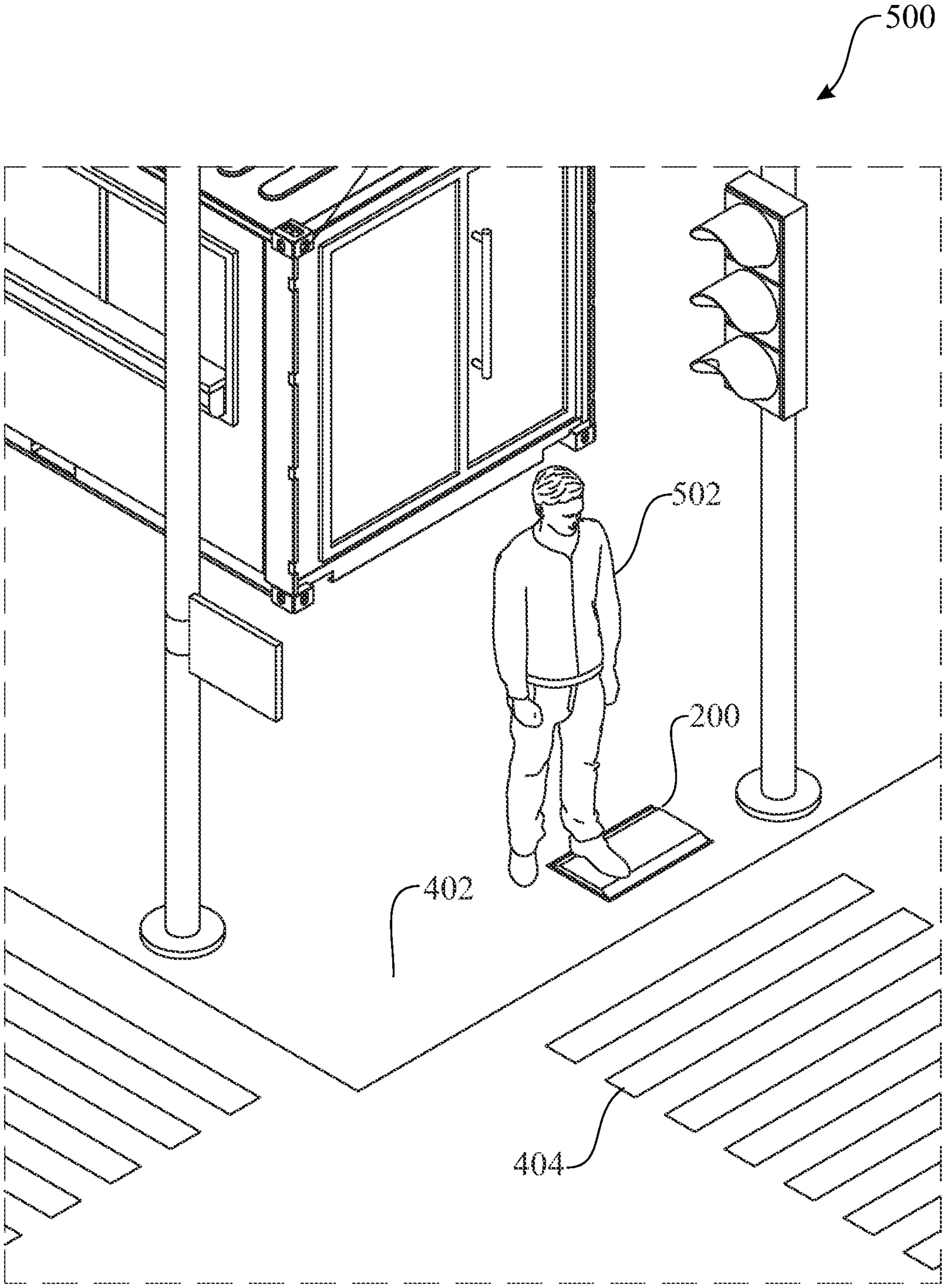
Figure 6:
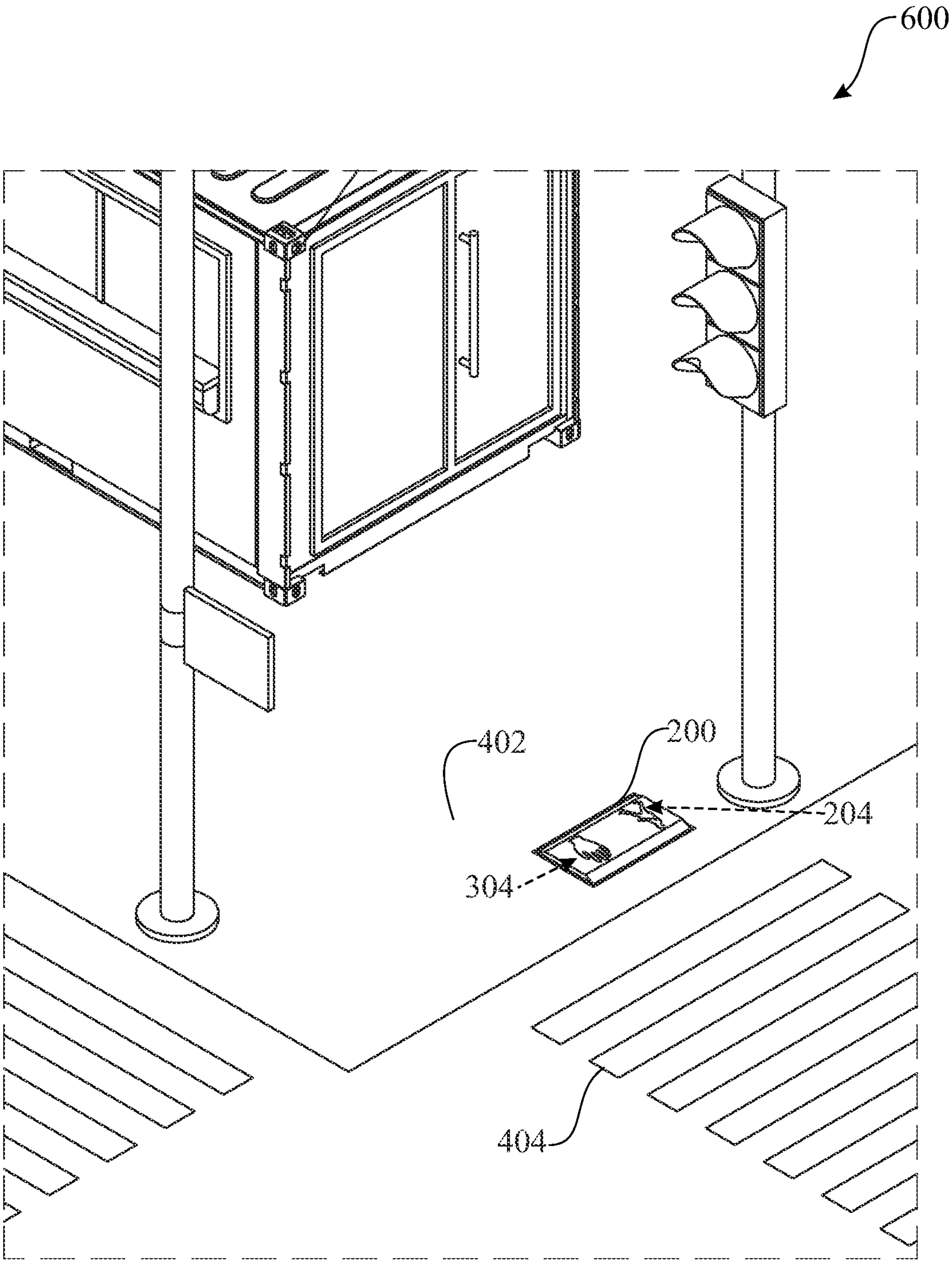
Figure 7:
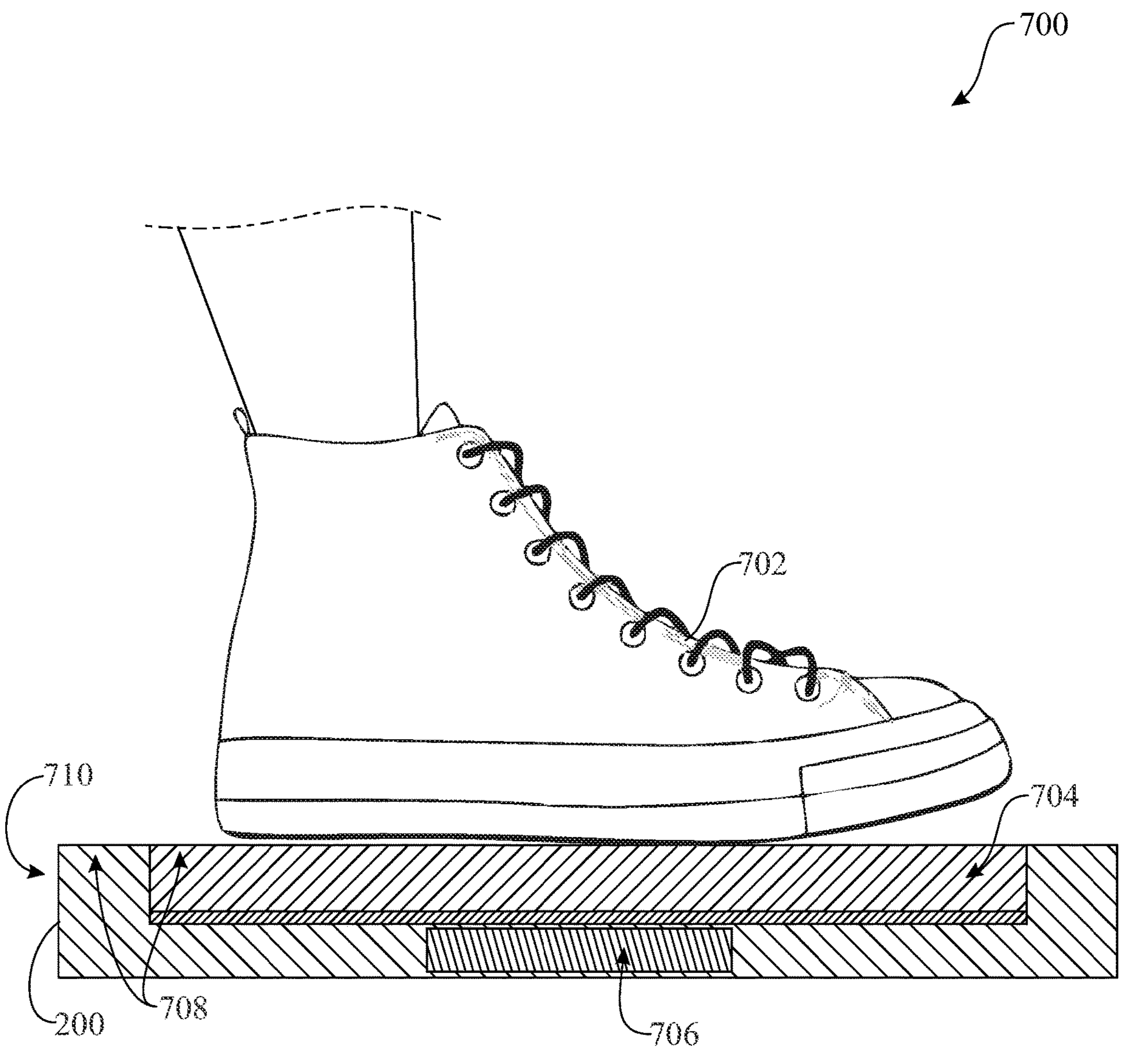
Figure 8:
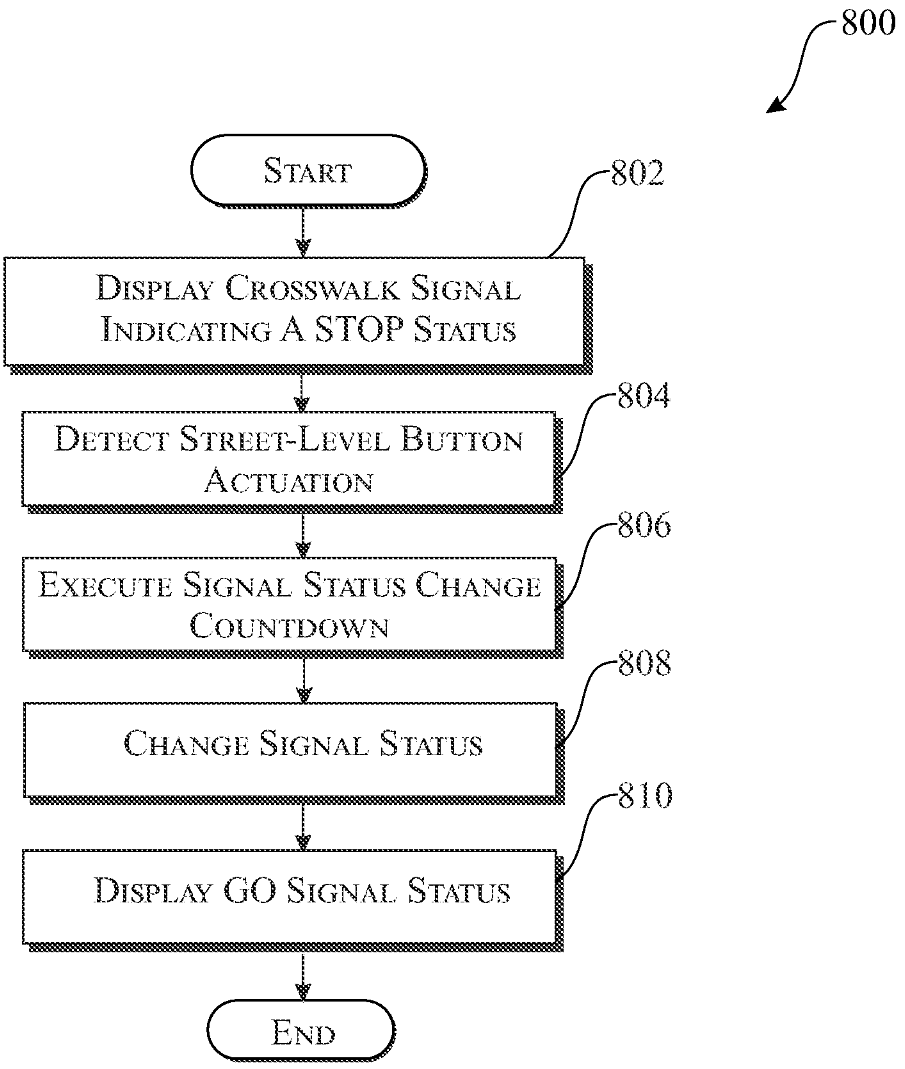

apparatus within which certain features of the present disclosure can be implemented, according to one or more embodiments;

FIG. 2 illustrates an example street-level signal status apparatus showing status icons that illuminate to indicate a current status, according to one or more embodiments of the disclosure;

FIG. 3 illustrates a second example street-level signal status apparatus showing status icons that illuminate to indicate a current status, according to one or more embodiments of the disclosure;

FIG. 4 illustrates a first view of an intersection showing the street-level actuator and signal status interface of an in-ground traffic actuation and signaling apparatus, according to one or more embodiments of the disclosure;

FIG. 5 illustrates a second view of an intersection showing the street-level actuator and signal status interface of an in-ground traffic actuation and signaling apparatus, according to one or more embodiments of the disclosure;

FIG. 6 illustrates a third view of an intersection showing the street-level actuator and signal status interface of an in-ground traffic actuation and signaling apparatus, according to one or more embodiments of the disclosure;

FIG. 7 illustrates a view of a pedestrian's foot interacting with the in-ground traffic actuation and signaling apparatus, according to one or more embodiments of the disclosure; and FIG. 8 presents a flow chart illustrating the process of enabling a pedestrian to depress an in-ground actuator/button to trigger a change in walk signal status, according to one or more embodiments.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present disclosure is directed toward enabling a pedestrian to depress an in-ground actuator/button to trigger a change in walk signal status.

Figure 1:
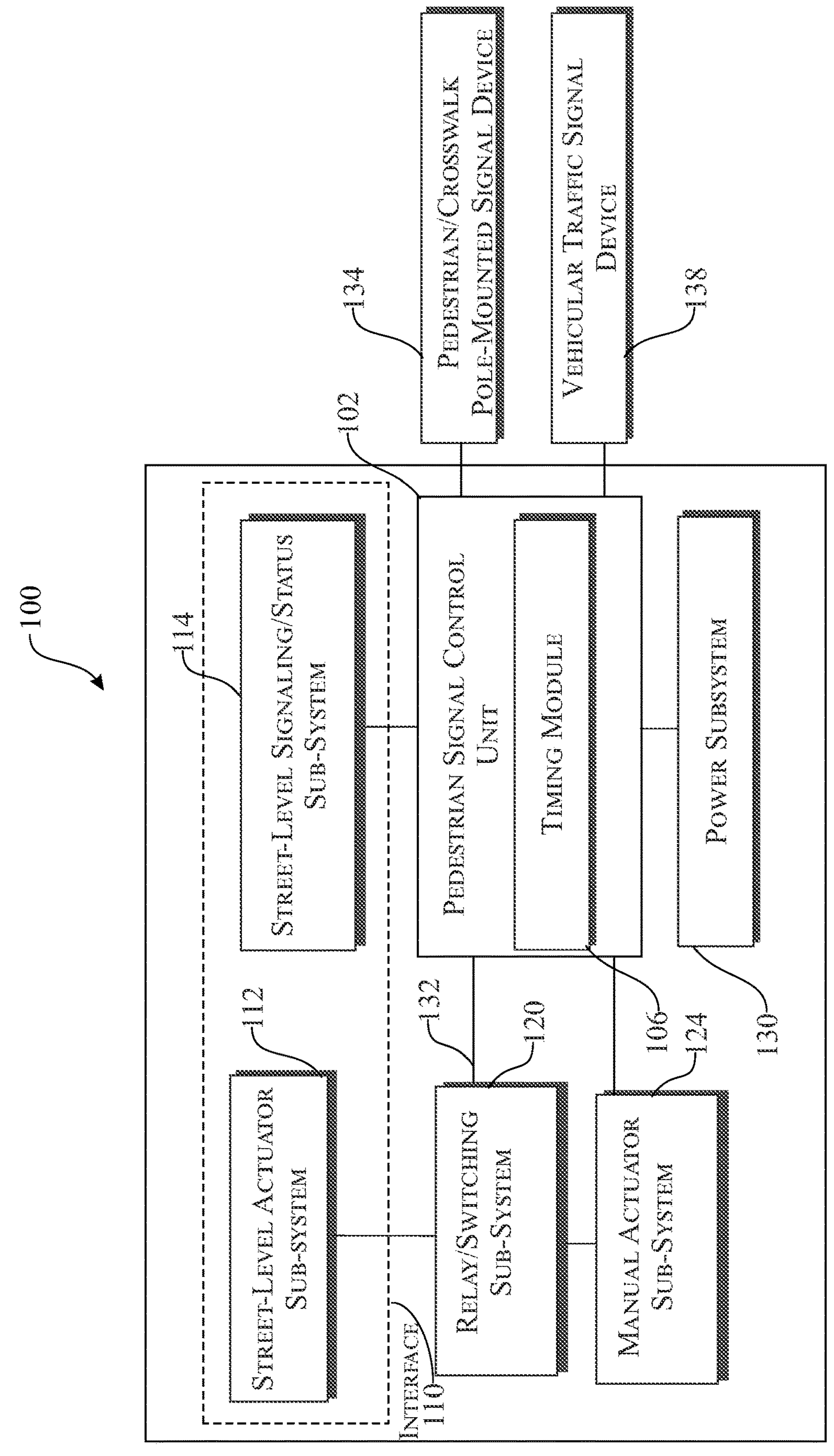
FIG. 1 illustrates a block diagram representation of an example in-ground crosswalk control and signaling (ICCS)

With reference now to the figures, and beginning with FIG. 1, there is depicted a block diagram representation of an example in-ground crosswalk control and signaling (ICCS) apparatus within which certain features of the present disclosure can be implemented, according to one or more embodiments.

In one or more embodiments, ICCS apparatus 100, which is managed by a pedestrian signal control (PSC) unit 102, also includes a street-level actuator sub-system 112 and a street-level signaling/status sub-system 114, which collectively provide a street-level actuator and signal status interface 110. Additionally, the ICCS apparatus 100 includes a relay/switching subsystem 120, a manual actuator subsystem and a power sub-system 130. As shown, the PSC unit 102 also includes a timing module 106 which provides a countdown timer (not explicitly shown).

The PSC unit 102 is communicatively coupled, via system bus/interlink 132, to the street-level actuator and signal status interface 110. In one or more embodiments, the PSC unit 102 is communicatively coupled via system interlink 132 to the relay/switching subsystem 120, the manual actuator sub-system 124 and the power sub-system 130. System interlink 132 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components.

Certain of the functions supported and/or provided by the ICCS apparatus 100 are implemented by the PSC unit 102 and/or other device hardware, which enables the apparatus/device to implement/perform those function(s). Among the functions provided by the ICCS apparatus 100, and which are specific to the disclosure, are functions for: (a) displaying via a street-level actuator and signal status interface a crosswalk signal indicating a walk signal status; (b) detecting a street-level button actuation; (c) executing via a countdown timer a pedestrian walk signal status change countdown; (d) modifying the pedestrian/crosswalk signal status; (e) activating a set of lights/LEDS that are associated with a specified signal status icon; (f) periodically activating a set of lights/LEDS associated with a "STEP TO GO" command; and (g) providing audible indications of a walk signal status. According to the illustrative embodiment, the ISSC apparatus 100/PSC unit 102 initiates a series of functional processes that enable the above functional features as well as additional features/functionality. These features/functionalities are described in greater detail below within the description of FIGS. 2-8.

Those of ordinary skill in the art will appreciate that the hardware components and basic configuration depicted in FIG. 1 may vary. The illustrative components within the ISSC apparatus 100 are not intended to be exhaustive, but rather are representative to highlight essential components that are utilized to implement the present disclosure. For example, other devices/components may be used in addition to or in place of the hardware depicted. The depicted example is not meant to imply architectural or other limitations with respect to the presently described embodiments and/or the general disclosure.

FIG. 2 illustrates an aerial view of an example street-level actuator and signal status interface showing status icons, according to one or more embodiments of the disclosure. The street-level actuator and signal status interface 110 comprises both a hidden below ground segment and an exposed street-level segment 200 which is illustrated via the aerial view. As illustrated, the street-level segment 200 of the street-level actuator and signal status interface 110 includes status indicator icons including an arrow adjacent to a walking pedestrian 204, and a "STEP TO GO" command 206.

According to an aspect, the street-level segment incorporates a pressure sensitive area that is used to control a crosswalk street signal. The pressure sensitive area is designed to be actuated by foot action or pressure applied by a tire or wheel. According to one or more related aspects, the pressure sensitive area is a portion of a button/actuator which can be depressed by a pedestrian's foot, a scooter wheel, a bicycle type, a wheel of a wheelchair, etc., to initiate a countdown to a change of walk signal status. According to one or more related aspects, the street-level segment 200 protrudes from the pavement/ground in which the street-level segment is embedded to enable the button/actuator to be accessible and to enable an individual to easily interact with and depress the button/actuator. The actuation used to trigger a change of signaling status is described in greater detail in FIG. 7.

In order to clearly indicate an active signal status, the street-level actuator and signal status interface 110 includes a light system (not explicitly shown), which may include a number of light-emitting diodes (LEDs). Each status icon is associated with a particular subset of lights/LEDS. Thus, the in-ground crosswalk control and signaling (ICCS) apparatus 100 indicates that an individual(s) may cross a street (e.g., via crosswalk) by activating a first set of lights/LEDS that are associated with the walking pedestrian icon 204. According to an implementation, the first set of lights/LEDS include green lights/LEDS, which intuitively indicate a GO signal status, conforming with universal traffic signaling color standards. On the other hand, red lights/LEDs within associated STOP indicator icons/symbols can be used to intuitively indicate a STOP status.

According to an aspect, by periodically activating a second set of lights/LEDS associated with the "STEP TO GO" command 206, the in-ground crosswalk control and signaling (ICCS) apparatus 100 can remind an individual(s) that he may trigger a change in signal status from a STOP signal to a GO signal by depressing the button/actuator portion of the street-level actuator and signal status interface 110.

According to an aspect, the street-level actuator and signal status interface 110 includes one or more embedded speakers (not explicitly shown). Thus, in addition to providing visible indications of signal status, the street-level actuator and signal status interface 110 provides audible indications of signal status.

According to one or more aspects, the street-level actuator and signal status interface 110 provides signals and buttons that may be configured to allow a pedestrian to actuate the buttons by foot while monitoring the signals with their head/eyes directed towards the ground at the exposed interface. The street-level actuator and signal status interface 110 helps to prevent the spread of germs while providing a supplementary signaling means for those that choose to focus their attention at the street-level. For example, a person focused/fixated on the smart-phone screen can easily see or glance at the signaling status icons in a lower line of sight of the individual/pedestrian.

As indicated in FIG. 1, in-ground crosswalk control and signaling (ICCS) apparatus 100 is not a replacement for the crosswalk signs and pedestrian call buttons that already exist but is a supplement to the pole-mounted signs and buttons. According to an aspect, the street-level actuator and signal status interface 110 which may be embedded in the pavement/sidewalk emits red or green lights to tell an individual/pedestrian whether to walk or not. According to one or more aspects, the in-ground crosswalk control and signaling (ICCS) apparatus 100 provides light indicators embedded in the ground using at least three (3) color settings, such as yellow, green and red, to let the person activating the switch know the status of crossing the street or crosswalk.

According to one or more aspects, the ICCS apparatus 100 includes the street-level actuator and signal status interface 110 to enable communication with a blind person and/or someone having one or more of a set of disabilities. Thus, for example, the street-level actuator and signal status interface 110 can be actuated by the wheel of a wheel-chair. In addition, the street-level actuator and signal status interface 110 provides audible signal status indications when an individual steps on the actuator/button or depresses the actuator/button with a walking stick or white cane.

According to one or more aspects, the ICCS apparatus 100 may be expected to help reduce the many deaths and accidents that occur every year, particularly after dark (i.e., at night), as a result of drivers' blind spots. According to one or more aspects, the street-level actuator and signal status interface 110 can help to save lives by alerting drivers who may be in the process of making a left turn or a right turn while the street-level actuator and signal status interface 110 indicates an active walk status. In particular, at night-time, a driver can be alerted that a pedestrian may be crossing based on the active walk status illumination 210 coming from the street-level actuator and signal status interface 110. As a result of the illumination-based alert, the ICCS apparatus 100 causes drivers to proceed with enhanced caution while observing a pedestrian's right-of-way priority.

FIG. 3 illustrates an aerial view of an example street-level actuator and signal status interface showing STOP signal status indicator icons, according to one or more embodiments of the disclosure. The street-level actuator and signal status interface 110 comprises both a hidden below ground segment and an exposed street-level segment 200 which is illustrated via the aerial view. As illustrated, the street-level segment 200 of the street-level actuator and signal status interface 110 includes status indicator icons including an open hand 304, and a "STOP" command 306.

In order to clearly indicate an active signal status, the street-level actuator and signal status interface 110 includes a light system (not explicitly shown), which may include a number of light-emitting diodes (LEDs). Each status icon is associated with a particular subset of lights/LEDS. Thus, the in-ground crosswalk control and signaling (ICCS) apparatus 100 indicates that an individual(s) may cross a street (e.g., via crosswalk) by activating a first set of lights/LEDS that are associated with the walking pedestrian icon 204. According to an implementation, the first set of lights/LEDS include green lights/LEDS, which intuitively indicate a GO status, conforming with universal traffic signaling color standards. On the other hand, red lights/LEDs within associated STOP indicator icons/symbols such as the open hand 304 can be used to intuitively indicate a STOP status.

FIG. 4 illustrates a first view of an intersection showing the street-level actuator and signal status interface 110 of an in-ground traffic actuation and signaling apparatus, according to one or more embodiments of the disclosure. View 400 comprises a sidewalk/pavement 402 in which the street-level actuator and signal status interface 110 (FIG. 1) is embedded. The street-level segment 200 of the street-level actuator and signal status interface 110 is illustrated. Also illustrated in view 400 is crosswalk 404.

According to one or more related aspects, the street-level segment 200 protrudes from the pavement/ground in which the street-level segment is embedded to enable the button/actuator to be accessible and to enable an individual to easily interact with and depress the button/actuator.

According to one or more aspects, the street-level actuator and signal status interface 110 provides signals and buttons that may be configured to allow a pedestrian to actuate the buttons by foot while monitoring the signals with their head/eyes directed towards the ground at the exposed interface. The street-level actuator and signal status interface 110 helps to prevent the spread of germs while providing a supplementary signaling means for those that choose to focus their attention at the street-level.

According to one or more aspects, the ICCS apparatus 100 provides light indicators embedded in the ground to let the person activating the switch know the status of crossing the street or crosswalk.

FIG. 5 illustrates a second view of an intersection showing the street-level actuator and signal status interface 110 of an in-ground traffic actuation and signaling apparatus, according to one or more embodiments of the disclosure. View 500 comprises a sidewalk/pavement 402 in which the street-level actuator and signal status interface 110 (FIG. 1) is embedded. The street-level segment 200 of the street-level actuator and signal status interface 110 is illustrated. Also illustrated in view 500 is crosswalk 404. Additionally, an individual 502 is shown with is foot positioned on street-level interface segment 200.

According to one or more aspects, the street-level actuator and signal status interface 110 provides signals and buttons that may be configured to allow a pedestrian to actuate the buttons by foot while monitoring the signals with their head/eyes directed towards the ground at the exposed interface. According to one or more aspects, the ICCS apparatus 100 provides light indicators embedded in the ground to let the person activating the switch know the status of crossing the street or crosswalk.

FIG. 6 illustrates a third view of an intersection showing the street-level actuator and signal status interface 110 of an in-ground traffic actuation and signaling apparatus, according to one or more embodiments of the disclosure. View 600 comprises a sidewalk/pavement 402 in which the street-level actuator and signal status interface 110 (FIG. 1) is embedded. The street-level segment 200 of the street-level actuator and signal status interface 110 is illustrated. Also illustrated in view 600 is crosswalk 404. Additionally, the street-level actuator and signal status interface 110 includes status indicator icons including a walking pedestrian 204 corresponding to a GO signal status, and an open hand 304 corresponding to a STOP signal status.

According to one or more aspects, the street-level actuator and signal status interface 110 provides signals and buttons that may be configured to allow a pedestrian to actuate the buttons by foot while monitoring the signals with their head/eyes directed towards the ground at the exposed interface. According to one or more aspects, the ICCS apparatus 100 provides light indicators embedded in the ground to let the person activating the switch know the status of crossing the street or crosswalk.

FIG. 7 illustrates a view of a pedestrian's foot interacting with [depressing a button of] the in-ground traffic actuation and signaling apparatus, according to one or more embodiments of the disclosure. View 700 comprises an individual's foot/shoe 702 depressing the street-level segment 200, and in particular, a pressure sensitive button/actuator of the street-level actuator and signal status interface 110. As illustrated, the pressure sensitive area represents a first terminal 704. Also illustrated is a second/lower terminal 706.

According to an aspect, the street-level segment incorporates a pressure sensitive area that is used to control a street signal. The pressure sensitive area is designed to be actuated by foot action or pressure applied by a tire or wheel. According to an aspect, the pressure sensitive area is a portion of a button/actuator which can be depressed by a pedestrian's foot, a scooter wheel, a bicycle type, a wheel of a wheelchair, etc., to initiate a countdown to a change of walk signal status. According to one or more related aspects, the street-level segment 200 protrudes from the pavement/ground in which the street-level segment is embedded to enable the button/actuator to be accessible and to enable an individual to easily interact with and depress the button/actuator. The individual/pedestrian depresses the actuator/button when the first terminal 704 is pushed into (electrical) contact with the second/lower terminal 706.

According to one or more aspects, an exposed portion of the street-level actuator and signal status interface 110 includes and/or is manufactured using a non-slip durable material 708. According to an aspect, the non-slip durable material is plastic. According to an aspect, the ICCS apparatus 100 is designed as a water-proof actuator and signaling apparatus to withstand a water breach due to an increased likelihood of external water presence and pressure based on the fact that the street-level actuator and signal status interface 110 is located on the ground. According to an aspect, the ICCS apparatus 100 is designed to include a rubber seal 710 around the exposed box-shaped portion of the street-level actuator and signal status interface 110 to prevent water from entering into the ICCS apparatus 100.

FIG. 8 is a flow chart illustrating the method by which the above process of the illustrative embodiments is completed. Although the method illustrated in FIG. 8 may be described with reference to components shown in FIGS. 1-7, it should be understood that this is merely for convenience and alternative components and/or configurations thereof can be employed when implementing the various methods. Key portions of the methods may be completed by pedestrian signal control (PSC) unit 102 within the in-ground crosswalk control and signaling (ICCS) apparatus 100 (FIG. 1) and controlling specific operations of/on the ICCS apparatus 100, and the method is thus described from the perspective of either/both the PSC unit 102 and the ICCS apparatus 100.

FIG. 8 presents a flow chart illustrating the process of enabling a pedestrian to depress an in-ground actuator/button to trigger a change in walk signal status, according to one or more embodiments. The process of FIG. 8 begins at the initiator/start block and proceeds to block 802, at which the PSC unit 102 displays/provides via a street-level actuator and signal status interface 110 a crosswalk signal indicating a STOP status.

According to an aspect, in order to clearly indicate an active/current signal status, the street-level actuator and signal status interface 110 includes a light system (not explicitly shown), which may include a number of light-emitting diodes (LEDs). Each status icon is associated with a particular subset of lights/LEDS. Thus, the in-ground crosswalk control and signaling (ICCS) apparatus 100 indicates that an individual(s) may cross a street (e.g., via crosswalk) by activating a first set of lights/LEDS that are associated with the walking pedestrian icon 204. According to an implementation, the first set of lights/LEDS include green lights/LEDS, which intuitively indicate a GO status, conforming with universal traffic signaling color standards.

On the other hand, red lights/LEDs within associated STOP indicator icons/symbols such as the open hand 304 can be used to intuitively indicate a STOP status.

At block 804, the PSC unit 102 detects a street-level button actuation. According to an aspect, the street-level segment incorporates a pressure sensitive area that is used to control a street signal. The pressure sensitive area is designed to be actuated by foot action or pressure applied by a tire or wheel. According to an aspect, the pressure sensitive area is a portion of a button/actuator which can be depressed by a pedestrian's foot, a scooter wheel, a bicycle type, a wheel of a wheelchair, etc., to initiate a countdown to a change of signaling status. According to one or more related aspects, the street-level segment 200 protrudes from the pavement/ground in which the street-level segment is embedded to enable the button/actuator to be accessible and to enable an individual to easily interact with and depress the button/actuator.

The PSC unit 102 executes and completes the signal status change countdown, as shown at block 806. In response to the signal status change countdown being completed, the PSC unit 102 changes the signal status, as shown at block 808. In particular, the PSC unit 102 changes the signal status from a STOP signal to a GO signal.

At block 810, the PSC unit 102 displays/provides via the street-level actuator and signal status interface 110 the GO signal status using corresponding icons/symbols. The process then proceeds to the end block.

According to one or more aspects, the street-level actuator and signal status interface provides signals and buttons that may be configured to allow a pedestrian to actuate the buttons by foot while monitoring the signals with their head/eyes directed towards the ground at the exposed interface. The street-level actuator and signal status interface helps to prevent the spread of germs while providing a supplementary signaling means for those that choose to focus their attention at the street-level. For example, a person focused/fixated on the smart-phone screen can easily see or glance at the signaling status icons in a lower line of sight of the individual/pedestrian.

According to one or more aspects, the ICCS apparatus includes a street-level actuator and signal status interface to enable communication with a blind person and/or someone having one or more of a set of disabilities. Thus, for example, the street-level actuator and signal status interface can be actuated by the wheel of a wheel-chair. In addition, the street-level actuator and signal status interface provides audible signal status indications when an individual steps on the actuator/button or depresses the actuator/button with a walking stick or white cane.

As described herein, a method and an apparatus provides an in-ground pedestrian crosswalk signaling actuator. An in-ground crosswalk control and signaling (ICCS) apparatus displays a crosswalk signal status and enables a pedestrian seeking to cross a street to depress the in-ground actuator button to change a signal status from a STOP signal to a GO signal. When a traffic signal controller of the ICCS apparatus detects a street-level button actuation, the controller initiates a status change countdown. In response to the countdown being completed, the controller changes the signal status to the GO signal. In addition, the controller triggers a display of a street-level signal indicating the current GO signal status. According to an aspect, the controller is electrically connected to a vehicular traffic light system/apparatus and a manual pedestrian crosswalk signal apparatus with which the ICCS apparatus remains synchronized.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An in-ground pedestrian crosswalk system, comprising:

an actuator device embedded within an opening in a sidewalk, the actuator device comprising a signal status interface configured to provide at least two different, street-level, visual signal status indicators comprising a first and a second signal status indicator, wherein said at least two visual status indicators are visible by a person positioned adjacent to the actuator device and with their eyes directed towards the ground at the signal status interface, wherein the actuator device is configured to activate by the signal status interface being depressed from above;

a timing module; and a power unit energizing the actuator device and the timing module, wherein activation of the actuator device by the signal status interface being depressed from above changes the first signal status indicator to the second signal status indicator for a set period determined by the timing module before changing back to the first signal status indicator from the second signal status indicator.

2. The in-ground pedestrian crosswalk system of claim 1, wherein the actuator device includes a first terminal spaced a distance from a second terminal, and contact between the first terminal and the second terminal activates the actuator device.

3. The in-ground pedestrian crosswalk system of claim 2, wherein activation of the actuator device is done by depressing the first terminal from above.

4. The in-ground pedestrian crosswalk system of claim 1, wherein the actuator device includes a portion hidden below ground of the sidewalk and an exposed portion.

5. The in-ground pedestrian crosswalk system of claim 1, further including an audible signal status indicator configured to emit an audible signal when the actuator device is activated.

6. The in-ground pedestrian crosswalk system of claim 1, wherein the actuator device includes a seal disposed around its periphery configured to prevent the penetration of moisture and liquid into the opening in the sidewalk where the actuator device is embedded within.

7. The in-ground pedestrian crosswalk system of claim 1, wherein the first and the second signal status indicators include a set of LEDs.

8. The in-ground pedestrian crosswalk system of claim 7, wherein the LEDs of the first and the second status indicators differ in color.

9. The in-ground pedestrian crosswalk system of claim 7, wherein the LEDs of the first and the second status indicators include alphabetical characters.

10. The in-ground pedestrian crosswalk system of claim 7, wherein the LEDs of the first and the second status indicators include LED-produced icons.

11. The in-ground pedestrian crosswalk system of claim 1, wherein the in-ground pedestrian crosswalk system is communicatively coupled with and configured to work in tandem with a pre-existing pole-mounted signal device and a vehicular traffic signal system.

12. An in-ground pedestrian crosswalk system, comprising:

a protective housing including an internal space, the housing embedded within an opening in a sidewalk;

a first terminal that includes a signal status interface configured to provide at least two different, street-level, visual signal status indicators visible by a person positioned adjacent to the first terminal and with their eyes directed towards the ground at the signal status interface;

a second terminal disposed a distance from the first terminal, wherein the first terminal and the second terminal are disposed within the internal space of the protective housing;

a timing module; and a power unit energizing the first terminal, the second terminal, and the timing module, wherein the first terminal and the second terminal are configured to come in contact when the signal status interface of the first terminal is depressed from above, and further wherein contact between the first terminal and the second terminal activates the signal status interface to change from emitting one of said at least two different, street-level, visual signal status indicators to emitting another of said at least two street-level, visual signal status indicators.

13. The in-ground pedestrian crosswalk system of claim 12, wherein the signal status interface includes a set of LEDs that emit the at least two visual signal status indicators.

14. The in-ground pedestrian crosswalk system of claim 13, wherein the at least two visual status indicators include one or more alphabetical characters.

15. The in-ground pedestrian crosswalk system of claim 13, wherein the at least two visual status indicators include one or more LED-generated icons.

16. The in-ground pedestrian crosswalk system of claim 13, further including an audible signal status indicator configured to emit an audible signal corresponding to the at least two visual signal status indicators.

17. The in-ground pedestrian crosswalk system of claim 13, wherein the in-ground pedestrian crosswalk system is communicatively coupled with and configured to work in tandem with a pre-existing pole-mounted signal device and a vehicular traffic signal system.

18. A method for providing street-level pedestrian crosswalk actuation, the method comprising:

providing a street-level actuator comprising a signal status interface, the street-level actuator embedded within an opening in a sidewalk;

displaying, via the signal status interface of the street-level actuator, a first street-level signal status indication indicative of a first crosswalk signal status;

detecting a depression from above of the signal status interface of the street-level actuator;

in response to detecting said depression from above, initiating a status change countdown;

in response to the status change countdown being completed, displaying, via the signal status interface of the street-level actuator, a second street-level signal status indication indicative of a second crosswalk signal status, the second street-level signal status indication different to the first street-level signal status indication; wherein said first and second street-level signal status indications are visible by a person positioned adjacent to the street-level actuator and with their eyes directed towards the ground at the street-level actuator.

19. The method of claim 18, wherein the signal status interface includes a plurality of LEDs that are configured to emit one or more alphabetical characters, numerical characters, or LED-generated icons.

20. The method of claim 18, further comprising providing an audible signal status indicator that is configured to emit an audible signal corresponding to the signal status interface.

* * * * *